US010623257B1

(12) United States Patent
Marquardt et al.

(10) Patent No.: US 10,623,257 B1
(45) Date of Patent: Apr. 14, 2020

(54) WIRELESS NETWORK SLICE DISTRIBUTED LEDGER

(71) Applicant: Sprint Communications Company L.P., Overland Park, KS (US)

(72) Inventors: Ronald R. Marquardt, Woodinville, WA (US); Arun Rajagopal, Leawood, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/122,926

(22) Filed: Sep. 6, 2018

(51) Int. Cl.
*H04L 12/24* (2006.01)
*H04W 16/18* (2009.01)
*H04W 92/12* (2009.01)

(52) U.S. Cl.
CPC ...... *H04L 41/0853* (2013.01); *H04L 41/0846* (2013.01); *H04W 16/18* (2013.01); *H04L 41/0889* (2013.01); *H04W 92/12* (2013.01)

(58) Field of Classification Search
CPC ............. H04L 41/0846; H04L 41/0853; H04L 41/0889; H04W 16/18; H04W 92/12
See application file for complete search history.

(56) References Cited

U.S. PATENT DOCUMENTS

| | | | |
|---|---|---|---|
| 10,299,128 B1 * | 5/2019 | Suthar | H04W 12/06 |
| 10,348,488 B1 * | 7/2019 | Paczkowski | H04L 63/107 |
| 2009/0094318 A1 | 4/2009 | Gladwin et al. | |
| 2016/0381150 A1 * | 12/2016 | Rajagopal | G06F 9/45558 709/223 |
| 2017/0141973 A1 * | 5/2017 | Vrzic | H04W 24/08 |
| 2018/0139042 A1 | 5/2018 | Binning et al. | |
| 2018/0191497 A1 * | 7/2018 | Paczkowski | H04L 9/0861 |
| 2018/0197156 A1 | 7/2018 | Beesley et al. | |
| 2018/0352501 A1 * | 12/2018 | Zhang | H04W 48/18 |
| 2019/0342095 A1 * | 11/2019 | Simons | H04L 9/321 |

FOREIGN PATENT DOCUMENTS

| | | |
|---|---|---|
| WO | 2017023196 A1 | 2/2017 |
| WO | 2017220115 A1 | 12/2017 |
| WO | 2018109598 A1 | 6/2018 |

\* cited by examiner

*Primary Examiner* — Walli Z Butt
*Assistant Examiner* — Ryan C Kavleski (57) ABSTRACT

A wireless network slice controller instructs a Network Function Virtualization (NFV) Management and Orchestration (MANO) system to implement a Network Service Descriptor (NSD) for a network slice. The NFV MANO system directs an NFV Infrastructure (NFVI) to execute NFV Virtual Network Functions (VNFs) for the network slice based on the NSD. The slice controller instructs a slice oracle to start a distributed ledger for the network slice. The slice oracle launches a distributed ledger for the network slice. The slice controller instructs access points to serve user devices for the network slice. The access points, NFVI, and VNFs serve the user devices. The slice oracle receives slice data from the access points, the NFVI, and the VNFs and transfers the slice data to the distributed ledger. The distributed ledger forms a consensus for the slice data and stores the slice data for the network slice.

16 Claims, 8 Drawing Sheets

WIRELESS NETWORK SLICE DISTRIBUTED LEDGER

TECHNICAL BACKGROUND

Wireless data networks serve wireless user devices with mobile data services like video streaming, internet access, and voice calling. The wireless data networks have wireless access points that exchange user data over the air with the wireless user devices. The wireless data networks also have Network Function Virtualization Infrastructures (NFVIs) that are directed by Management and Orchestration (MANO) systems. The MANO systems implement Network Service Descriptors (NSDs) to control the NFVIs. The NFVIs execute Virtual Network Functions (VNFs) responsive to the MANO system control. To deliver the wireless data services, the user devices communicate with the access points, and the access points communicate with the VNFs that are running in the NFVIs.

A network slice comprises a virtual portion of the wireless data network. The network slice may be an end-to-end network, core network, access network, or combinations thereof. To form a network slice, a network slice controller instructs the NFV MANO system to implement an NSD for the network slice. The NFV MANO system directs the NFVI to run the VNFs for the network slice based on the NSD. The network slice controller also instructs the wireless access points for the network slice to serve the wireless user devices for the network slice. To deliver wireless data services within the network slice, the user devices in the network slice communicate with the access points in the network slice, and these access points communicate with the VNFs in the network slice that are running in the NFVIs.

A distributed ledger is comprised of data blocks that are copied and executed across multiple computers. Each block has an immutable portion and a dynamic portion. The immutable portions of the ledger blocks interact with one another to reach consensus on new data before storing the new data in the dynamic portion of the ledger. For example, the ledger blocks may reach a consensus on a user's payment amount before storing the payment amount. Various consensus algorithms are available for use by the distributed ledger. The distributed ledger also uses ledger oracles to feed information into the distributed ledger and to read data from distributed ledger. Various ledger oracles are available for use by the distributed ledger as well.

Unfortunately, current wireless network slices do not effectively implement distributed ledgers. Moreover, the network slice controllers do not interact with the distributed ledger oracles to properly optimize network slice operations.

TECHNICAL OVERVIEW

A wireless network slice controller instructs a Network Function Virtualization (NFV) Management and Orchestration (MANO) system to implement a Network Service Descriptor (NSD) for a network slice. The NFV MANO system directs an NFV Infrastructure (NFVI) to execute NFV Virtual Network Functions (VNFs) for the network slice based on the NSD. The slice controller instructs a slice oracle to start a distributed ledger for the network slice. The slice oracle launches a distributed ledger for the network slice. The slice controller instructs access points to serve user devices for the network slice. The access points, NFVI, and VNFs serve the user devices. The slice oracle receives slice data from the access points, the NFVI, and the VNFs and transfers the slice data to the distributed ledger. The distributed ledger forms a consensus for the slice data and stores the slice data for the network slice.

DETAILED DESCRIPTION

Figure 1:
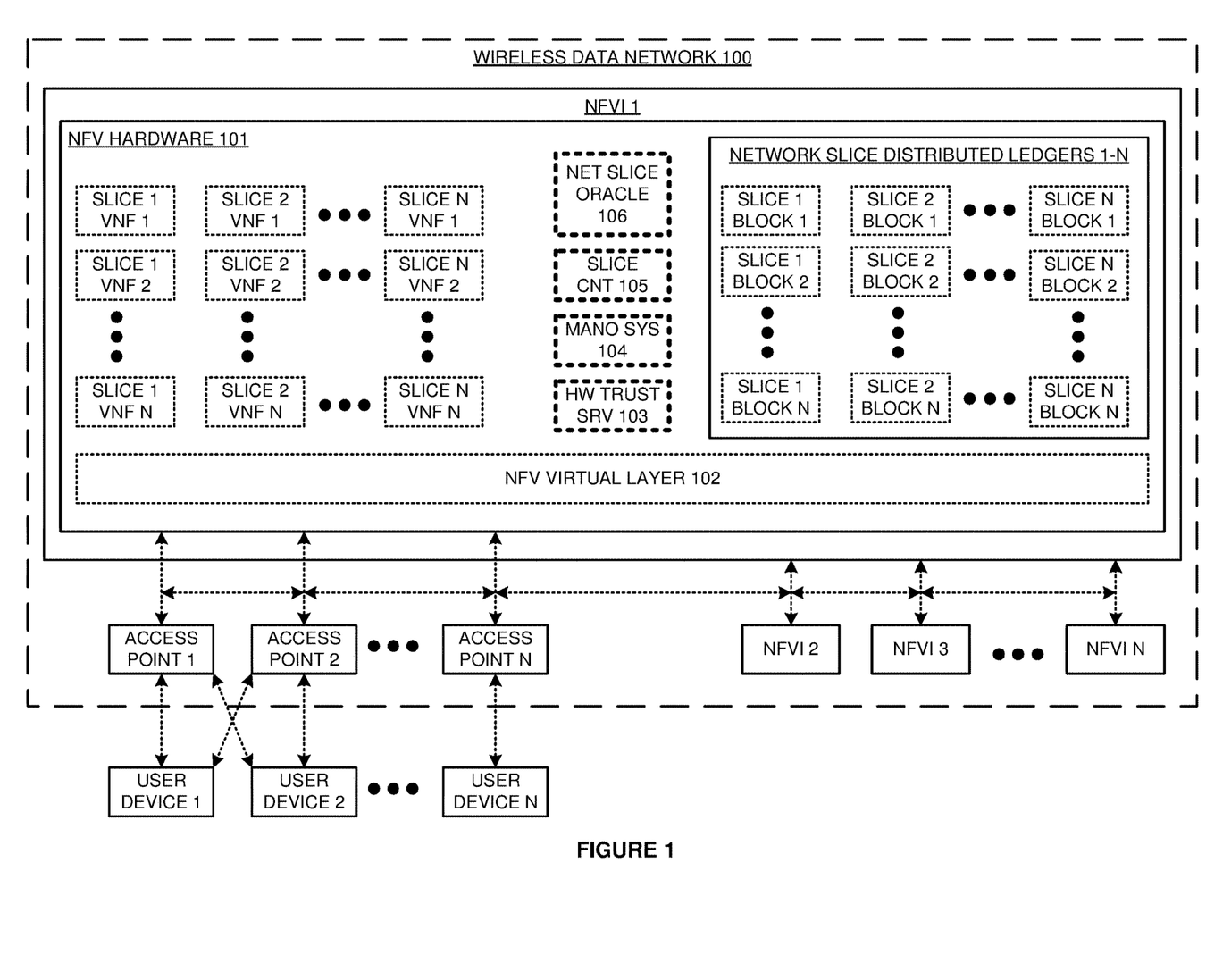
FIG. 1 illustrates a wireless data network that forms wireless communication network slices having distributed ledgers.

FIG. 1 illustrates wireless data network 100 that forms wireless communication network slices 1-N that have distributed ledgers 1-N. Network slices 1-N comprise virtual portions of wireless data network 100. Network slices 1-N may comprise end-to-end networks, core networks, access networks, or some other data communication networks—including combinations thereof.

Wireless data network 100 comprises user devices 1-N, access points 1-N, and Network Function Virtualization Infrastructures (NFVIs) 1-N. NFVI 1 comprises NFV hardware 101 that hosts NFV virtual layer 102, Hardware (HW) trust server (SRV) 103, Management and Orchestration MANO system (SYS) 104, network slice controller (CNT) 105, and network slice oracle 106. NFVI hardware 101 also hosts Virtual Network Functions (VNFs) 1-N and network slice distributed ledgers 1-N for wireless communication network slices 1-N. Network slice distributed ledgers 1-N each comprise network slice blocks 1-N, where slick block 1 is the genesis block.

NFVIs 2-N are configured and operate in a similar manner as NFVI 1. User devices 1-N are linked with access points 1-N which are linked to NFVIs 1-N. NFVIs 1-N are also interconnected with one another. Wireless data network 100 may use various data network architectures. For example, wireless data network 100 may comprise thousands of NFVIs that control millions of access points that serve billions of user devices. In another example, wireless data network 100 may comprise a few NFVIs that control a dozen access points that serve a hundred user devices. User devices 1-N and access points 1-N typically communicate over wireless links, although wireline links or hybrid wireless/wireline links may be used as well.

User devices 1-N comprise computers, phones, headsets, graphic displays, vehicles, drones, sensors, or some other wireless communication apparatus. User devices 1-N execute user applications like video streaming, vehicle/drone control, remote computing, virtual reality, machine-to-machine communications, and internet access. User devices 1-N comprise wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The transceiver circuitry uses wireless network protocols like Fifth Generation New Radio (5GNR), Long Term Evolution (LTE), and Institute of Electrical and Electronic Engineers 802.11 (WIFI). The baseband circuitry comprises processing circuitry, memory circuitry, software, bus circuitry, and transceiver circuitry. The software includes an operating system and modules for Physical Layer (PHY), Media Access Control (MAC), Radio Link Control (RLC), Packet Data Convergence Protocol (PDCP), Radio Resource Control (RRC), Service Data Application Protocol (SDAP), and the like.

Access points 1-N comprise base stations, hotspots, or some other wireless communication nodes. Access points 1-N have wireless transceiver circuitry and baseband circuitry. The wireless transceiver circuitry comprises antennas, modulators, amplifiers, filters, digital/analog interfaces, DSPs, memory circuitry, firmware/software, and bus circuitry. The transceiver circuitry uses wireless network protocols like 5GNR, LTE, and WIFI. The baseband circuitry comprises processing circuitry, memory circuitry, software, bus circuitry, and transceiver circuitry. The software includes an operating system and modules for the PHY, MAC, RLC, PDCP, RRC, SDAP, and the like. The software also modules for hardware trust, NFVI orchestration, slice control, and oracle access. Access points 1-N and user devices 1-N typically communicate over wireless links, although wireline links or hybrid wireless/wireline links may be used as well.

NFV hardware 101 comprises processing circuitry, memory circuitry, software, bus circuitry, and transceiver circuitry. The transceiver circuitry comprises computer Input/Output (I/O) ports, memory, and DSPs. The processing circuitry comprises Central Processing Units (CPUs), Graphics Processing Units (GPUs), Application Specific Integrated Circuits (ASICs), and the like. The memory circuitry comprises volatile and non-volatile data storage like Random Access Memory (RAM), cache memory, flash drives, disk drives and the like. The memory circuitry stores NFV VNFs 1-N for network slices 1-N, network slice blocks 1-N for network slices 1-N, NFV virtual layer 102, hardware trust server 103, MANO system 104, slice controller 105, and network slice oracle 106. The processing circuitry executes the NFV VNFs, slice blocks, NFV virtual layer 102, hardware trust server 103, MANO system 104, network slice controller 105, and network slice oracle 106.

NFV virtual layer 102 comprises operating systems, hypervisors, virtual switches, virtual machines, NFV MANO interfaces, and the like. The NFV VNFs comprises network functions like Access and Mobility Management Functions (AMF), Authentication Server Function (AUSF), Unified Data Management (UDM), Policy Control Function (PCF), Session Management Function (SMF), Application Function (AF), Mobility Management Entity (MME), Home Subscriber System (HSS), Serving Gateway (S-GW), Packet Data Network Gateway (P-GW), Policy Charging Rules Function (PCRF), Internet Protocol Multimedia Subsystem (IMS), and possibly other networking functions.

Network slice controller 105 stores hardware trust keys and algorithms to validate hardware trust for NFV MANO system 104 and to validate hardware trust for network slice oracle 106. Network slice oracle 106 stores hardware trust keys and algorithms to validate hardware trust for network slice controller 105 and to validate hardware trust for network slice blocks 1-N. Network slice blocks 1-N store hardware trust keys and algorithms to obtain hardware trust for themselves and to validate hardware trust of network slice oracle 106.

Slice blocks 1-N store slice data for the wireless communication network slices 1-N in network slice distributed ledgers 1-N. The slice data indicates the individual user devices, access points, NFVI circuitry, virtual layer software, VNFs, and the like that form the individual wireless communication network slices 1-N. For network slices 1-N, slice blocks 1-N also store metadata indicating data usage, usage quality, hardware trust status, accounting data, and the like.

For wireless communication network slice 1, network slice controller 105 directs the creation, operation, and termination of the network slice based on a slice configuration. The slice configuration indicates the requirements for the network slice including the user devices 1-N, access points 1-N, and the fronthaul/backhaul links that comprise wireless communication network slice 1. The slice configuration also indicates a Network Service Descriptor (NSD) that details the VNFs, Virtual Links (VLs), Physical Network Functions (PNFs), PNF Forwarding Graphs (PNFFGs), and VNF Forwarding Graphs (VNFFGs). The slice configuration indicates hardware trust requirements and hardware trust validation keys and algorithms. The slice configuration also indicates distributed ledger requirements for the network slice like the slice controllers, slice oracles, and genesis blocks to use for the wireless communication network slice.

Network slice controller 105 directs network slice oracle 106 to start a distributed ledger for wireless communication network slice 1 based on the slice configuration. To start the distributed ledger, network slice oracle 106 launches slice block 1 for wireless communication network slice 1 based on a genesis block template indicated in the slice configuration. Network slice controller 105 instructs access points 1-N to serve user devices 1-N for wireless communication network slice 1 based on the slice configuration. Network slice controller 105 directs MANO system 104 to implement the NSD for wireless communication network slice 1 based on the slice configuration. NFV MANO system 104 directs NFVI 1 to execute NFV VNFs 1-N for wireless communication network slice 1 based on the NSD, VNFD, VLD, and VNFFG. NFV MANO system 104 directs NFVI 1 and slice 1 VNFs to interact with access points 1-N and NFVIs 2-N based on the PNFD and the PNFFG for wireless communication network slice 1. In some scenarios, some of the network slices may share some of the VNFs.

The components of wireless communication network slice 1 may be configured or directed to transfer slice data to network slice oracle 106. For example, VNF 2 in network slice 1 may transfer slice data through MANO system 104 to network slice oracle 106. The user devices and access points may execute applications that transfer slice data through slice controller 105 to oracle 106. Network slice oracle 106 receives slice data from user devices 1-N, wireless access points 1-N, NFV virtual layer 102, and NFV VNFs 1-N. Network slice oracle 106 transfers the slice data to slice block 1 in distributed ledger 1 for wireless communication network slice 1. Slice block 1 forms a consensus for the slice data across other NFVIs 2-N and responsively stores the slice data in the distributed ledger format.

Slice block 1 processes the slice data to generate slice information. Slice block 1 transfers the slice information to network slice oracle 106. Network slice oracle 106 transfers the slice information to network slice controller 105. Network slice controller 105 modifies the slice configuration based on the slice information. Over time, network slice oracle 106 receives additional slice data and transfers the additional slice data to slice blocks 2-N in distributed ledger 1 wireless communication network slice 1. Slice blocks 2-N each form their own consensus for the additional slice data and responsively store the additional slice data. Slice blocks 2-N each process the additional slice data to generate additional slice information and transfer the additional slice information to network slice oracle 106. Network slice oracle 106 transfers the additional slice information to network slice controller 105. Network slice controller 105 modifies the slice configuration based on the additional slice information.

For example, a slice block for network slice 1 may process slice data that indicates excessive video streaming for user device 2 on wireless communication network slice 1. The slice block responsively generates and transfers corresponding slice information to network slice oracle 106 that indicates the excessive video streaming for user device 2 on wireless communication network slice 1. Slice oracle 106 transfers the indication to network slice controller 105. Network slice controller 105 directs a video server VNF in network slice 1 to throttle video streaming for user device 2. Network slice controller 105 may also modify the slice configuration so user device 2 remains throttled in new distributed ledgers that are based on the slice configuration.

In another example, a slice block of network slice 1 may process new slice data that indicates a new access point for network slice 1. After consensus and storage, the slice block transfers slice information to network slice oracle 106 that indicates the new access point has been added to the slice block for network slice 1. Slice oracle 106 indicates that the new access point has been stored in distributed ledger 1 for network slice 1 to network slice controller 105. Network slice controller 105 responsively modifies the slice configuration to identify the new access point and perhaps stores its cryptographic keys. Network slice controller 105 may even augment the genesis block template with cryptographic keys to so a new distributed ledger for a new network slice can readily validate hardware trust digital certificates for the new access point.

Wireless communication network slices 2-N transfer slice data to their slice blocks in distributed ledgers 2-N in a similar manner. NFVIs 2-N transfer their slice data to slice blocks in their distributed ledgers 2-N as well. Note that many NFVIs 1-N reach consensus and host the same slice block for the same network slice. Advantageously, network slice controller 105 updates the slice configurations to maintain accurate high-resolution data communication service information. In addition, network slice controller 105 continually develops slice templates that optimize the deployment of future network slices.

Figure 2:
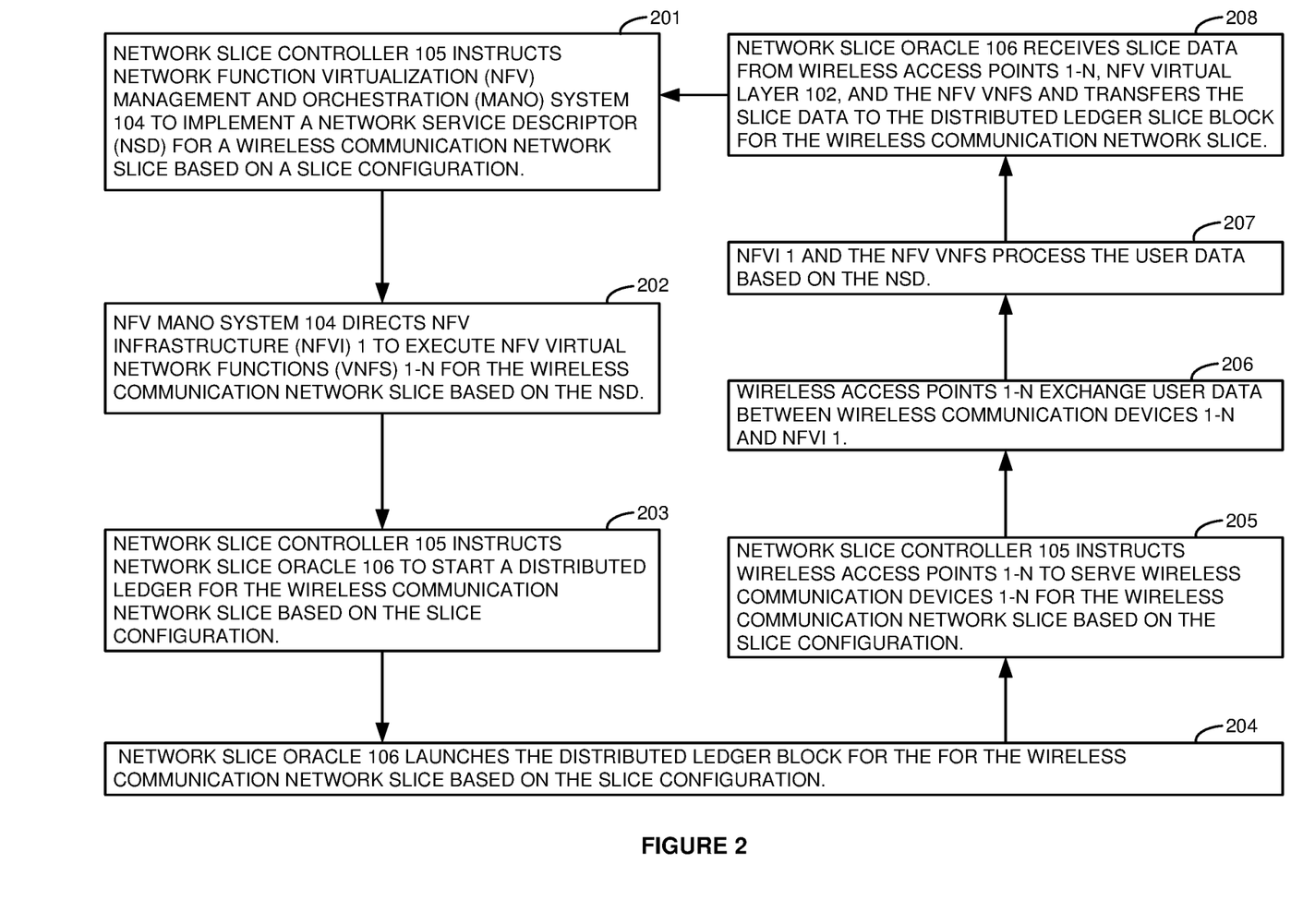
FIG. 2 illustrates the operation of the wireless data network to form the wireless communication network slices having the distributed ledgers.

FIG. 2 illustrates the operation of wireless data network 100 to form a wireless communication network slice that has a distributed ledger. Network slice controller 105 directs Network Function Virtualization (NFV) Management and Orchestration (MANO) system 104 to implement a Network Service Descriptor (NSD) for a wireless communication network slice (201). The NSD comprises VNFDs, VLDs, PNFDs, VNFFGs, and PNFFGs for the wireless communication network slice. NFV MANO system 104 directs NFV Infrastructure (NFVI) 1 to execute NFV VNFs 1-N for the wireless communication network slice based on the NSD (202).

Network slice controller 105 directs network slice oracle 106 to start a distributed ledger for the wireless communication network slice based on its slice configuration (203). To start the distributed ledger, network slice oracle 106 launches slice block 1 for wireless communication network slice 1 based on the slice configuration (204). Network slice controller 105 instructs access points 1-N to serve user devices 1-N for the wireless communication network slice based on the slice configuration (205).

Access points 1-N exchange user data between user devices 1-N and NFVI 1 for the wireless communication network slice based on the NSD (206). NFVI 1 and NFV VNFs 1-N process the user data for the wireless communication network slice based on the NSD (207). The components of the wireless communication network slice transfer slice data to network slice oracle 106. Network slice oracle 106 receives the slice data from user devices 1-N, access points 1-N, NFVI virtual layer 102, and NFV VNFs 1-N. Network slice oracle 106 transfers the slice data to the slice block in the distributed ledger for the wireless communication network slice (208).

Figure 3:
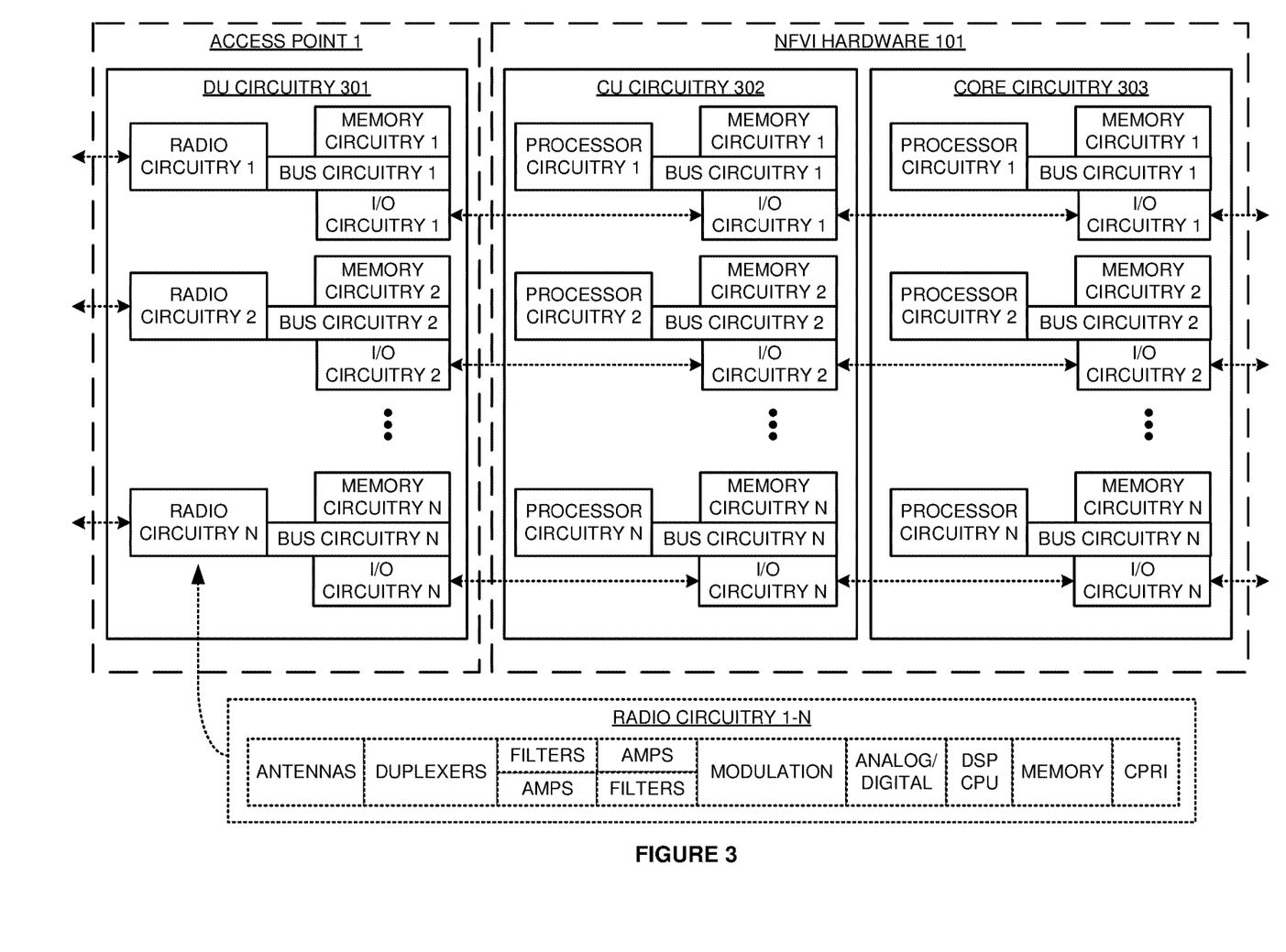
FIG. 3 illustrates a hardware architecture for the wireless communication network slices.

FIG. 3 illustrates a hardware architecture for wireless communication network slices 1-N. The hardware architecture is exemplary and other hardware architectures could be used. The hardware architecture for wireless communication network slices 1-N comprises access point 1 and NFVI hardware 101 for NFVI 1. Access points 2-N and NFVIs 2-N would be configured and operate in a similar manner. Access point 1 comprises Distributed Unit (DU) circuitry 301, and NFVI hardware 101 comprises Central Unit (CU) circuitry 302 and core circuitry 303. DU circuitry 301 comprises radio circuitry 1-N, memory circuitry 1-N, I/O circuitry 1-N, and bus circuitry 1-N. Bus circuitry 1 couples radio circuitry 1, memory circuitry 1, and I/O circuitry 1. Bus circuitry 2-N, radio circuitry 2-N, memory circuitry 2-N, and I/O circuitry 2-N may be respectively coupled together in a similar manner. I/O circuitry 1 in DU 301 circuitry is linked to I/O circuitry 1 in CU circuitry 302 which is linked to I/O circuitry 1 in core circuitry 302. I/O circuitry 2-N are linked in a similar manner. Radio circuitry 1-N each comprise antennas, duplexers, filters, amplifiers, modulators, analog/digital interfaces, DSPs/CPUs, memory, and typically a radio interface like Common Public Radio Interface (CPRI).

In radio circuitry 1-N, the memories store DSP firmware and/or software. In DU circuitry 301, memory circuitry 1-N stores user data, operating systems, and network applications like PHY, MAC, RLC, PDCP, RRC and SDAP. In CU circuitry 302, memory circuitry 1-N stores user data, operating systems, and VNFs for PHY, MAC, RLC, PDCP, RRC, and SDAP. In core circuitry 303, memory circuitry 1-N stores user data, operating systems, and VNFs for AMF, UPF, SMF, PCF, AUSF, UDM, MME, SGW, PGW, PCRF, HSS, PCRF, and IMS. In radio circuitry 1-N, the DSPs execute their firmware/software to drive the exchange of data between the radio circuitry memories and the antennas. In radio circuitry 1-N, the CPUs execute their operating systems and network applications to drive the exchange of data between the radio circuitry memories and CU circuitry 302. In CU circuitry 302, processing circuitry 1-N executes their operating systems and VNFs to drive the exchange of data between DU circuitry 301 and core circuitry 303. In core circuitry 303, processing circuitry 1-N executes their operating systems and VNFs to drive the exchange of data between CU circuitry 302 and various external systems like the internet.

In radio circuitry 1-N of DU circuitry 301, the antennas receive wireless UL signals from user devices 1-N and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSPs. The DSPs recover UL data and signaling from the UL signals and transfer the recovered UL data and signaling to the memory circuitry. The CPUs execute their OS and network applications to process the UL data and signaling. The network applications drive DU circuitry 301 to transfer UL data and signaling from its memory circuitry 1-N over its I/O circuitry 1-N to I/O transceivers 1-N, memory circuitry 1-N, and VNFs 1-N in CU circuitry 302.

In CU circuitry 302, processing circuitry 1-N executes their OS and VNFs to process the UL data and signaling. The VNFs drive CU circuitry 302 to transfer UL data and signaling from its memory circuitry 1-N over its I/O circuitry 1-N to I/O transceivers 1-N, memory circuitry 1-N, and VNFs 1-N in core circuitry 303. In core circuitry 303, processing circuitry 1-N executes their OS and VNFs to process the UL data and signaling. The VNFs drive core circuitry 303 to transfer UL data from its memory circuitry 1-N over its I/O circuitry 1-N to various systems.

In core circuitry 303, I/O circuitry 1-N receives Downlink (DL) data from various systems and stores the DL data in its memory circuitry 1-N. In core circuitry 303, processing circuitry 1-N executes their OS and VNFs to process the DL data. The VNFs drive core circuitry 303 to transfer DL data and signaling from its memory circuitry 1-N over its I/O circuitry 1-N to I/O transceivers 1-N, memory circuitry 1-N, and VNFs 1-N in CU circuitry 302. In CU circuitry 302, processing circuitry 1-N executes their OS and VNFs to process the DL data and signaling. The VNFs drive CU circuitry 302 to transfer DL data and signaling from its memory circuitry 1-N over its I/O circuitry 1-N to I/O transceivers 1-N, memory circuitry 1-N, and network applications in DU circuitry 301. In DU circuitry 301, radio circuitry 1-N executes their OS and network applications to process the DL data and signaling. The network applications drive DU circuitry 301 to transfer DL data and signaling from its memory circuitry 1-N over its radio circuitry 1-N to user devices 1-N. To perform this transfer from radio circuitry 1-N, the DSPs retrieve DL data and signaling and transfer corresponding DL signals to the analog/digital interface. The analog/digital interface converts the digital DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to user devices 1-N.

Figure 4:
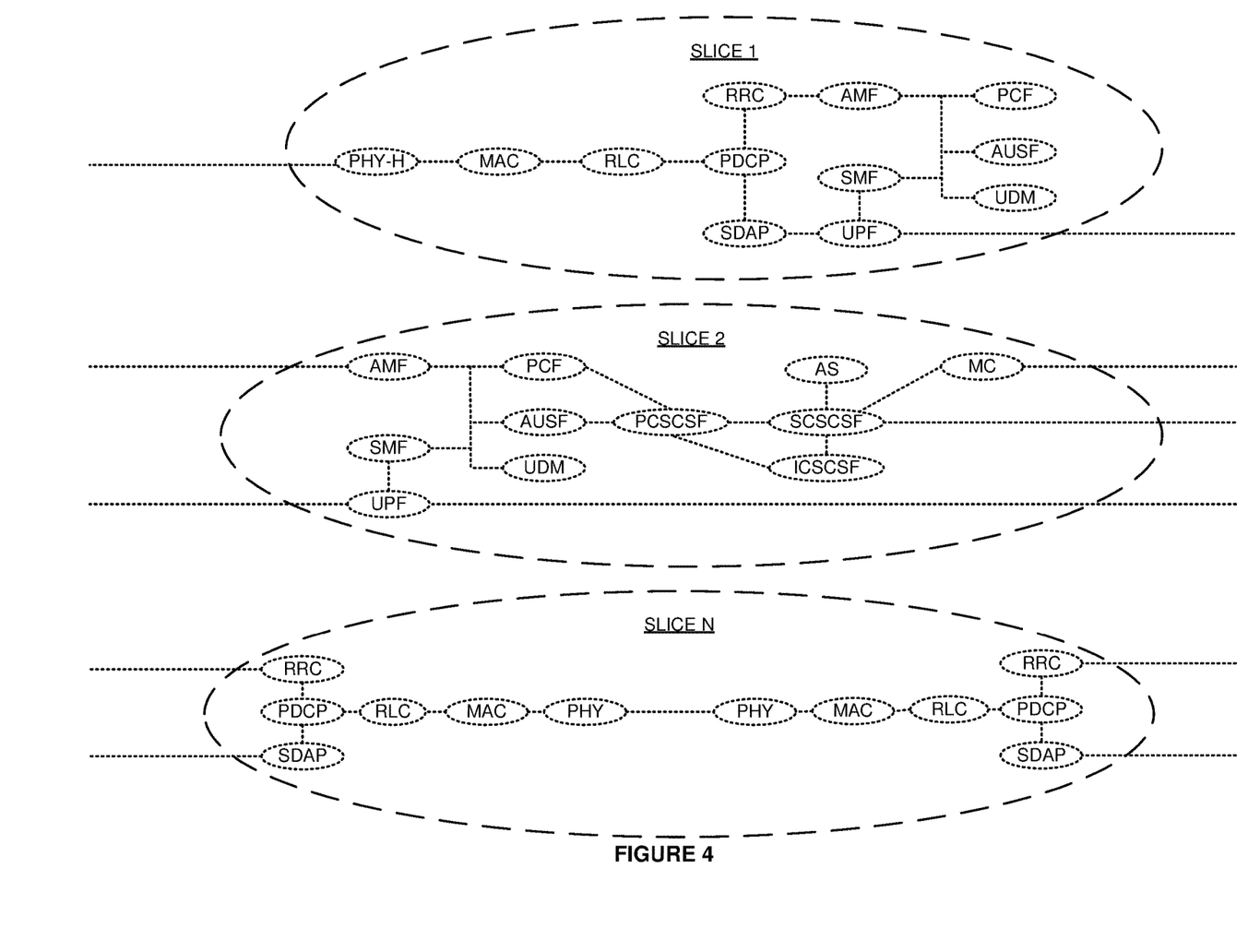
FIG. 4 illustrates a software architecture for the wireless communication network slices.

FIG. 4 illustrates a software architecture for wireless communication network slices 1-N. The software architecture is exemplary and other software architectures could be used. Wireless communication network slice 1 comprises both a Fifth Generation New Radio (5GNR) access network and a Fifth Generation Core (5GC) network. Wireless communication network slice 1 comprises VNFs for PHY-HIGH (PHY-H), MAC, RLC, PDCP, RRC, SDAP, AMF, SMF, UPF, PCF, AUSF, and UDM. A PHY-LOW (PHY-L) application in DU circuitry would be coupled to the PHY-H VNF in CU circuitry—although the DU/CU software split could be elsewhere like between PDCP network applications and RRC VNFs for a low-latency Vehicle-to-Vehicle (V2V) network slice. The VNFs for AMF, UPF, SMF, PCF, AUSF, and UDM are typically executed in core circuitry 303, although the CU/core software split could be elsewhere like between UPF VNFs and SMF VNFs.

Wireless communication network slice 2 comprises a 5GC network that features an Internet Multimedia Subsystem (IMS). Wireless communication network slice 2 comprises VNFs for AMF, SMF, UPF, PCF, AUSF, UDM, Proxy Call State Control Function (PCSCF), Serving Call State Control Function (SCSCF), Interrogating Call State Control Function (ICSCF), Application Server (AS), and Message Center (MC). The VNFs for slice 2 are typically executed in core circuitry 303, although the CU/core software split could be elsewhere Wireless communication network slice N comprises a 5GNR user device and a 5GNR access network. Wireless communication network slice N comprises user applications for PHY, MAC, RLC, PDCP, RRC, and SDAP. Wireless communication network slice N comprises network applications for PHY, MAC, and RLC. Wireless communication network slice N comprise VNFs for PDCP, RRC, and SDAP. The RRC, PDCP, SDAP, RLC, MAC, and PHY user applications on the left are executed in user devices. The RLC, MAC, and PHY network applications on the right left are executed in DU circuitry 301. The RRC, PDCP, and SDAP VNFs on the right are executed in CU circuitry 302, although the DU/CU software split could be elsewhere. The two PHYs in slice N are coupled by a wireless 5GNR link.

In network slice 1, a PHY-L network application in DU circuitry 301 exchanges data and signaling with a PHY-H VNF in DU circuitry 301. The PHY-L in DU circuitry 301 serves user devices 1-N. The PHY-L component performs lower PHY functions like packet formation/deformation, windowing/de-windowing, guard-insertion/guard-deletion, and Fast Fourier Transforms (FFTs)/Inverse FFTs (IFFTs), data mapping/de-mapping, interleaving/de-interleaving, parsing/de-parsing, Forward Error Correction (FEC) encoding/decoding, control insertion/removal, Resource Element (RE) mapping/de-mapping, precoding, layer mapping/de-mapping, modulation mapping/de-mapping, channel estimation, channel equalization, and Inverse Discrete Fourier Transforms (IDFT). The PHY-L component exchanges data and signaling with the PHY-H. The PHY-H The PHY-H component performs tasks like scrambling/descrambling, FEC encoding/decoding, parsing/de-parsing, interleaving/de-interleaving, data mapping/de-mapping, channel coding/decoding, rate matching/de-matching, modulation mapping/de-mapping, layer mapping/de-mapping, IDFT, channel estimation, channel equalization, precoding, and RE mapping/de-mapping.

The MAC processes user data to map between the MAC transport channels and MAC logical channels. The MAC determines buffer status, power headroom, channel quality, Hybrid Automatic Repeat Request (HARQ) acknowledgements, UE identifiers, and the like. To perform HARQ on the UL, the MAC transfers ACKs for UL data and signaling. To perform random access, the MAC processes access signaling to identify user devices 1-N and initiate scheduling. To perform power control, the MAC processes channel quality and power headroom to adjust user power to overcome poor channel quality within headroom and interference limits. To perform scheduling, the MAC processes radio channel quality, buffer status, and radio interference to assign data and signaling to wireless payloads. The MAC signals the schedule to user devices 1-N. The MAC processes performance data like data-rate, delay, error-rate, and jitter to maintain Quality-of-Service (QoS) for the user devices.

The RLC maps between the MAC logical channels and Protocol Data Units (PDUs). The RLC performs ARQ for the UL data and signaling by transferring UL ACKs. The RLC performs ARQ for the DL by retransmitting DL data and signaling that was not properly received. The RLC adds sequence numbers on the DL and performs resequencing on the UL. The RLC performs segmentation and resegmentation. The RLC exchanges data and signaling with the PDCP. The PDCP maps between the PDUs from the RLC and Service Data Units (SDUs) for the RRC/SDAP. The PDCP handles security by applying ciphering. The PDCP performs header compression and decompression. The PDCP adds sequence numbers and re-orders received SDUs in their proper sequence. The PDCP eliminates duplicate UL data. The RRC exchanges SDUs that carry signaling and with the PDCP.

The RRC interacts with the AMF to establish and terminate data sessions. The RRC supports messaging between AMFs and user devices. The RRC directs the broadcast of system information to user devices 1-N. The RRC component transfers paging to user devices 1-N. The RRC handles security and key management. The RRC component handles handover operations. The RRC manages user device UE reporting and QoS. The SDAP exchanges SDUs that carry data with the PDCP. The SDAP exchanges data with the UPF which exchanges the data with other systems under the control of the SMF. The SDAP maps between the SDUs and QoS flows. The SDAP marks QoS flows with the proper QoS. The UPF exchanges data between the SDAP and other systems. The SMF controls UPF sessions. The AMF and SMF access the PCF, AUSF, and UDM for policy, authorization, and content.

In network slice 2, the AMF interacts with RRCs to establish and terminate data sessions. The AMF messages user devices 1-N. The UPF exchanges data between SDAPs and other systems. The SMF controls UPF sessions. The AMF and SMF access the PCF, AUSF, and UDM for policy, authorization, and content. The PCSCF interacts with the UPF to exchange Session Initiation Protocol (SIP) signaling. The PCSCF interacts with the AUSF and HSS to authorize users. The PCSCF interacts with the PCF and PCRF to order multimedia connections for user devices. The SCSCF establishes multimedia sessions for user devices. The ICSCF provides external connectivity to various databases. The AS serves user applications like video and voice calling. The MC serves user messaging applications.

In network slice N, the RRC and SDAP user applications on the left exchange data and signaling with user applications in user devices 1-N. The RRC user application exchanges signaling with the PDCP user application and the SDAP user application exchanges user data with the PDCP user application. The PDCP user application exchanges user data and signaling with the RLC user application which exchanges user data and signaling with the MAC user application. The MAC user application exchanges user data and signaling with the PHY user application. The PHY user application exchanges user data and signaling with the PHY network application over a 5GNR link. The PHY network application exchanges user data and signaling with the MAC network application. The MAC network application exchanges user data and signaling with the RLC network application. The RLC network application exchanges user data and signaling with the PDCP VNF. The PDCP VNF exchanges signaling with the RRC VNF and exchanges user data with the SDAP VNF. The RRC and SDAP VNFs exchange user data and signaling with AMFs and UPFs. In network slice N, the PHYs, MACs, RLCs, PDCPs, RRCs, and SDAPs in the both the user device and the access network operate as indicated above for network slice 1.

Other network slice architectures could be used. For example, network slices 2 and N could be combined to form an end-to-end network slice. Ion another example, network slices 1 and 2 could be integrated to form an access/core network slice with IMS.

Figure 5:
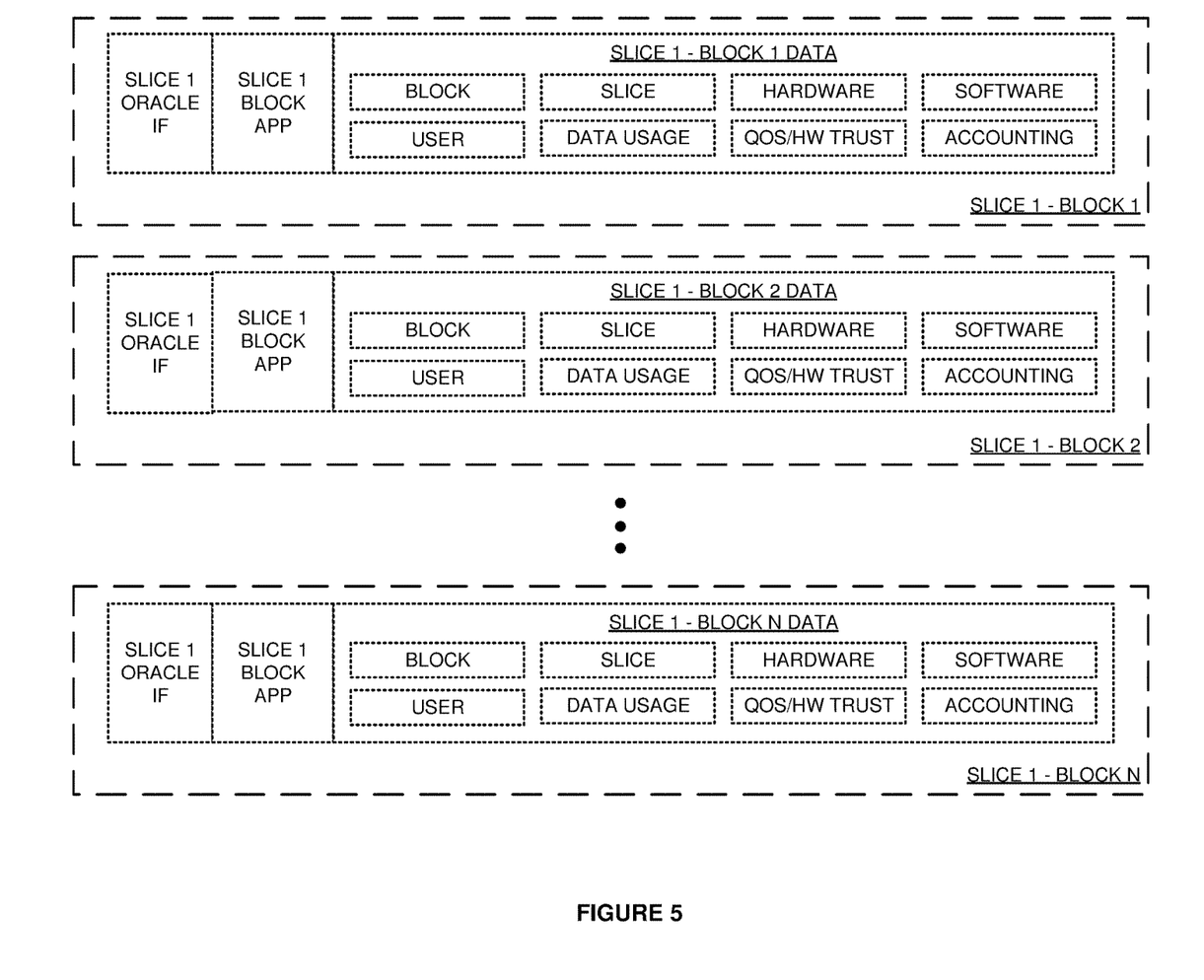
FIG. 5 illustrates distributed ledger blocks for the wireless communication network slices.

FIG. 5 illustrates distributed ledger slice blocks for the wireless communication network slices. Exemplary slice blocks 1-N for the distributed ledgers for network slice 1 are shown, although slice blocks may vary from this specific example. Slice blocks 1-N each comprise hardware (processing, I/O, memory, and bus circuitry) and software (operating systems, slice oracles, and slice controllers) that are described herein. These components are usually distributed across several NFVIs 1-N.

Slice block 1 represents the genesis slice block for wireless communication network slice 1. Slice block 1 is based on the genesis block template in the slice configuration for wireless communication network slice 1. Advantageously, new wireless network communication slices may use these slice configuration templates for more efficient network slice deployment and operation. Moreover, network slice controller 105 continually updates these slice configuration templates to continuously improve the operative efficiency of the wireless communication network slices.

For wireless communication network slice 1, slice block 1 comprises: slice 1 oracle interface, slice 1 block application, and slice 1 block 1 data. The slice 1 block 1 data comprises block data, slice data, hardware data, software data, user data, usage data, QoS data, hardware trust data, accounting data, and typically other data. Although the slice 1 block 1 data changes over time, the slice 1 oracle interface and the slice 1 block application are immutable for a specific distributed ledger. Thus, the immutable slice 1 oracle interface and the immutable slice 1 block application are executed across multiple NFVIs 1-N to reach consensus and achieve distributed storage for new slice 1 block 1 data. A new distributed ledger may have a different oracle interface and block application, but the new ledger may still implement improvements to the interface and application and through the slice configuration template that is optimized by network slice controller 105.

The network slice 1 oracle interface receives slice data from network slice oracle 106 of wireless communication network slice 1. The immutable network slice 1 oracle interface uses crypto-codes and addresses from the network slice template to communicate with and validate hardware trust for network slice oracle 106. The slice 1 block application receives the authenticated slice data from the network slice 1 oracle interface. The slice 1 block application reaches a consensus with the slice 1 block applications that are executing in other NFVIs 2-N. After consensus is reached, the slice 1 block application stores the slice 1 block 1 data. The immutable slice 1 block application also processes the stores the slice data to generate and transfer slice information to network slice oracle 106 over the slice 1 oracle interface.

In slice blocks 1-N, the block data includes a hash of the previous block, a genesis block initiator ID, nonce, time stamps, roots, hashes, and the like. The slice data indicates the NSD, access nodes, fronthaul/backhaul circuits, NFVIs, MANOs, oracles, network elements, and the like. The hardware data identifies processing circuitry like CPUs and GPUs, memory circuitry like flash drives and disk drives, and I/O circuitry like Network Interface Cards (NICs). The software data identifies the operating systems, virtual machines, networking applications, VNFs, MANO systems, slice oracles, slice controllers, and hardware trust servers— along with their executing hardware. The user data identifies users and their user devices. The data usage indicates the dates/times and amounts of data usage for the users. The QoS data indicates quality metrics, alarms, terminations for the delivered communication service for the individual users. The QoS data may describe a termination of the network slice including causes. The hardware trust data indicates hardware trust validations and failures. The accounting data indicates user payments and credits for the usage.

Figure 6:
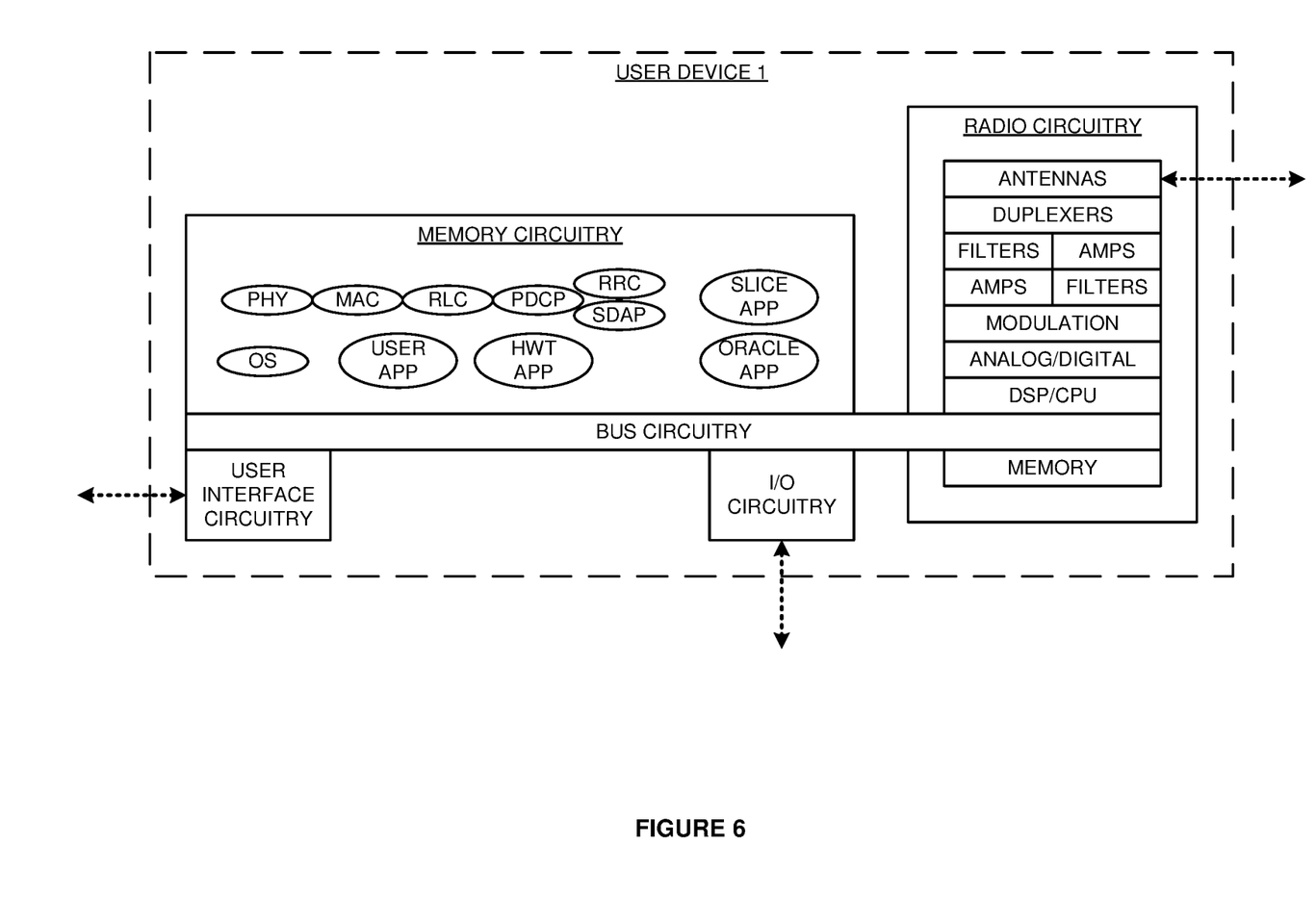
FIG. 6 illustrates a hardware/software architecture for wireless user devices.

FIG. 6 illustrates a hardware/software architecture for user device 1. User devices 2-N could be configured and operate in a similar manner. The architecture is exemplary and other architectures could be used. User device 1 comprises radio circuitry, memory circuitry, I/O circuitry, bus circuitry, and user interface circuitry. The bus circuitry couples the radio circuitry, memory circuitry, I/O circuitry, and user interface circuitry. The radio circuitry comprises antennas, duplexers, filters, amplifiers, modulation, analog/digital interfaces, DSPs/CPUs, memory, and typically other components. In user device 1, the memory circuitry stores user data, operating systems, user applications, and network applications like PHY, MAC, RLC, PDCP, RRC, and SDAP. The memory circuitry also stores applications that interface with hardware trust servers, slice oracles, and slice controllers.

In the radio circuitry, the memory stores DSP firmware and software. The antennas wirelessly exchange data and signaling with access points 1-N. The DSP executes firmware/software to drive the exchange of data between the radio circuitry memory and the antennas. The CPU executes the operating system and network applications to drive the exchange of data between the user interface circuitry, I/O circuitry, memory circuitry, and the radio circuitry.

In the radio circuitry, the antennas receive wireless DL signals from access points 1-N and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSPs. The DSPs recover DL data and signaling from the DL signals and transfer the recovered DL data and signaling to the memory circuitry. The CPU executes the OS and network applications to process the DL data and signaling and to transfer the DL data to memory circuitry for consumption by the user applications, user interface circuitry, I/O circuitry, and/or memory circuitry.

The CPU executes the OS and user applications to generate user data or receive user data from the I/O circuitry or user interface circuitry. The CPU executes the OS and network applications to generate UL data and signaling. The DSP executes its software and firmware to transfer the UL data and signaling to antennas. The antennas wirelessly transmit the user data and signaling to access points 1-N.

The CPU executes the hardware trust application to obtain hardware trust for user device 1 from a hardware trust server, transfer hardware trust digital certificates to requesting systems, and validate the hardware trust certificates of access points, slice oracles, and slice controllers, and user devices. The CPU executes the network slice application to interact with network slice controller 106 for provisioning and service control. The CPU executes the oracle application to transfer slice data to network slice oracle 106 for the network slice distributed ledger like user ID, device ID, usage times, amounts, locations, quality, hardware trust status, and the like.

Figure 7:
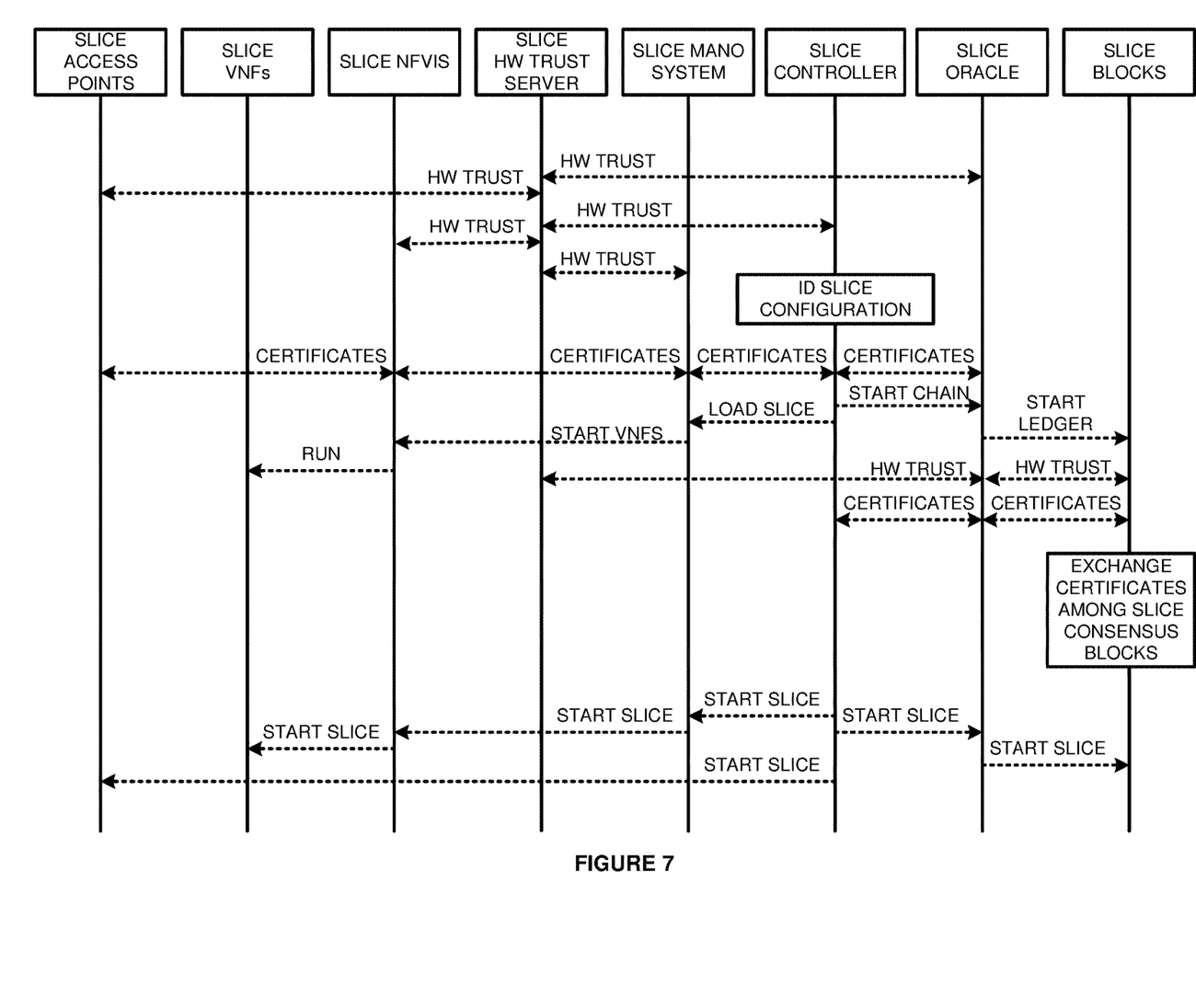
FIG. 7 illustrates the operation of a wireless data network to form hardware trusted wireless communication network slices.

FIG. 7 illustrates the operation of a wireless data network like wireless data network 100 described above to form hardware trusted wireless communication network slices. A slice hardware trust server exchanges hardware trust data with a slice oracle. In some examples, the hardware trust data could be a random challenge from the hardware trust server to the slice oracle where the oracle generates or obtains a hash of the random challenge with a physically-embedded, read-only hardware trust code from its executing hardware. The slice oracle returns the hardware trust result. The slice hardware trust server performs the same hash and compares the results which match for hardware trust. The slice hardware trust server issues a hardware trust digital certificate to the slice oracle. The slice hardware trust server also exchanges hardware trust data and issues hardware trust digital certificates to slice access points, slice controllers, slice NFVIs, and slice MANO systems.

The slice controller identifies a slice configuration for a new network slice. The slice configuration may be generated from a slice template that has been optimized over time. The slice controller exchanges and validates hardware trust digital certificates with the slice oracle and the slice MANO system. The slice controller exchanges and validates hardware trust digital certificates for the slice access points and the and the slice VNFs over the slice MANO system.

The slice controller directs the slice oracle to start a distributed ledger based on the genesis block template in the slice configuration. The slice oracle launches the genesis slice block. The slice controller also directs the slice MANO system to load the slice by implementing one or more NSDs. The slice MANO system directs the slice NFVIs to run the slice VNFs and supporting software per the NSD. The slice NFVIs run the slice VNFs and supporting software.

The genesis slice block is configured to exchange hardware trust data with the hardware trust server over the slice oracle. The slice hardware trust server issues a hardware trust digital certificate the genesis slice block over the slice oracle, and the genesis slice block provides the hardware trust digital certificate to the slice controller over the slice oracle. The genesis slice block exchanges hardware trust digital certificates with other slice blocks that will subsequently interact to reach consensus and save block data.

After hardware trust is established for the network slice, the network slice controller transfers instructions to the slice MANO system and to the slice oracle to start slice operations. The slice oracle directs the genesis slice block to begin slice operations. The slice MANO system instructs the NFVIs and the VNFs (over the NFVIs) to begin slice operations. The network slice controller transfers instructions to the access points to start slice operations.

Figure 8:
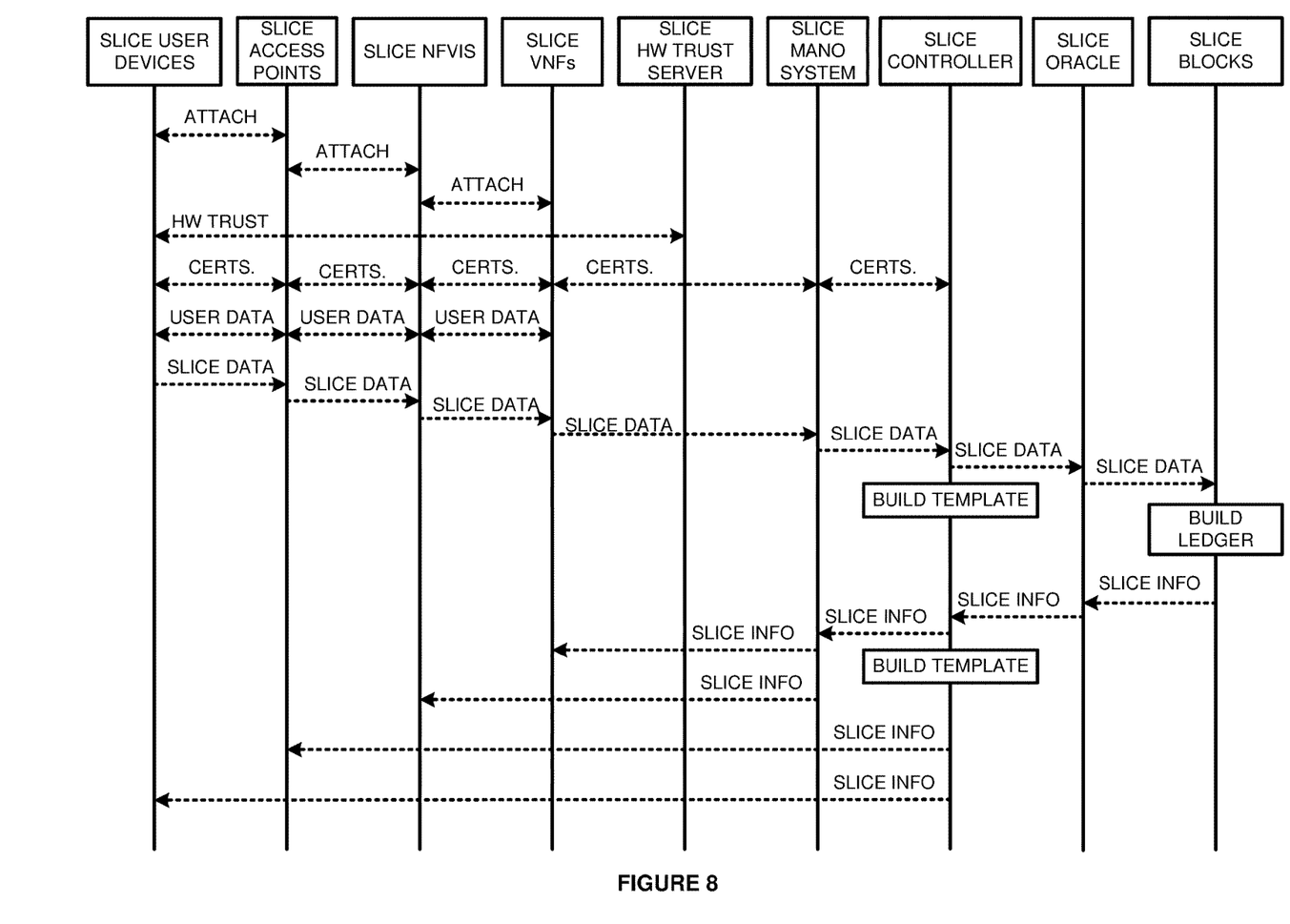
FIG. 8 illustrates the operation of the wireless data network to operate the hardware trusted wireless communication network slices.

FIG. 8 illustrates the operation of the wireless data network like wireless data network 100 described above to operate hardware trusted wireless communication network slices. Slice user devices attach to the slice access points. The slice access points exchange attachment signaling with the slice VNFs over the slice NFVIs for the slice user devices. Initially, the slice VNFs authorize the slice user devices for hardware trust sessions. The slice user devices and the slice hardware trust server exchange hardware trust data and the hardware trust server issues hardware trust digital certificates to the slice user devices. The slice user devices transfer their hardware trust digital certificates to the slice controller over the slice access points, slice NFVIs, slice VNFs, and slice MANO system.

After hardware trust with slice user devices is established—typically on an individual basis, the hardware trusted user devices may then exchange user data with the slice access points. The slice access points exchange user data with the slice NFVIs. The slice NFVIs exchange user data with slice VNFs. Slice data is then generated and transferred to the slice controller from the slice user devices, access points, NFVIs, VNFs, and MANO system. The slice controller transfers the slice data to the slice oracle and the slice oracle transfers the slice data to the slice blocks. The slice controller processes the slice data to build the slice template.

The slice blocks reach consensus across the slice NFVIs and store the slice data to build the slice distributed ledger. The slice blocks process the slice data to generate and transfer slice information to the slice oracle. For example, the slice blocks may process slice data indicating a user time-on-slice and a corresponding usage amount to generate a service discount for the user that is then indicated in the slice information sent to the slice oracle. Typically, the slice blocks reach a consensus on the slice information before transfer to the slice oracle. The slice controller processes the slice information to build the slice template. The slice controller also transfers slice information to the slice MANO system, slice access points, and slice user devices. The slice MANO system transfers slice information to the slice NFVIs which transfer slice information to the slice VNFs.

The wireless data network circuitry described above comprises computer hardware and software that form a special-purpose machine—NFVI circuitry that creates wireless communication network slices that have distributed ledgers. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose NFVI circuitry that creates wireless communication network slices that have distributed ledgers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to implement a wireless communication network slice to serve user devices, the method comprising:
    a network slice controller instructing a Network Function Virtualization (NFV) Management and Orchestration (MANO) system to implement a Network Service Descriptor (NSD) for the wireless communication network slice based on a slice configuration and the NFV MANO system directing an NFV Infrastructure (NFVI) to execute NFV Virtual Network Functions (VNFs) for the wireless communication network slice based on the NSD;
    the network slice controller instructing a network slice oracle to start a distributed ledger for the wireless communication network slice based on the slice configuration and the network slice oracle launching a distributed ledger for the wireless communication network slice based on the slice configuration;
    the network slice controller instructing wireless access points to serve user devices for the wireless communication network slice based on the slice configuration and the wireless access points exchanging user data between the user devices and the NFVI;
    the NFVI and the NFV VNFs processing the user data based on the NSD;
    the network slice oracle receiving slice data from the wireless access points, the NFVI, and the NFV VNFs and transferring the slice data to the distributed ledger for the wireless communication network slice;
    the distributed ledger receiving and forming a consensus for the slice data, and in response, storing the slice data;
    the distributed ledger processing the slice data to generate slice information and transferring the slice information to the network slice oracle;
    the network slice oracle transferring the slice information to the network slice controller;
    the network slice controller modifying the slice configuration based on the slice information;
    the network slice oracle receiving additional slice data from the wireless communication devices and transferring the additional slice data to the distributed ledger for the wireless communication network slice; and
    the distributed ledger receiving and forming additional consensus for the additional slice data, and in response, storing the additional slice data.

2. The method of claim 1 further comprising:
    the distributed ledger processing the additional slice data to generate additional slice information and transferring the additional slice information to the network slice oracle;
    the network slice oracle transferring the additional slice information to the network slice controller; and
    the network slice controller modifying the slice configuration based on the additional slice information.

3. The method of claim 1 wherein the slice data stored in the distributed ledger indicates the user devices in the wireless communication network slice.

4. The method of claim 1 wherein the slice data stored in the distributed ledger indicates the wireless access points in the wireless communication network slice.

5. The method of claim 1 wherein the slice data stored in the distributed ledger indicates the NFVI in the wireless communication network slice.

6. The method of claim 1 wherein the slice data stored in the distributed ledger indicates the NFVI circuitry in the wireless communication network slice.

7. The method of claim 1 wherein the slice data stored in the distributed ledger indicates the NFV VNFs in the wireless communication network slice.

8. The method of claim 1 further comprising:
the network slice controller validating hardware trust of the network slice oracle;
the network slice oracle validating hardware trust of the network slice controller;
the network slice oracle validating hardware trust of the digital ledger; and
the digital ledger validating hardware trust of the network slice oracle.

9. A wireless communication network to implement a wireless communication network slice to serve user devices, the wireless communication network comprising:
a network slice controller configured to instruct a Network Function Virtualization (NFV) Management and Orchestration (MANO) system to implement a Network Service Descriptor (NSD) for the wireless communication network slice based on a slice configuration and the NFV MANO system configured to direct an NFV Infrastructure (NFVI) to execute NFV Virtual Network Functions (VNFs) for the wireless communication network slice based on the NSD;
the network slice controller configured to instruct a network slice oracle to start a distributed ledger for the wireless communication network slice based on the slice configuration and the network slice oracle configured to launch a distributed ledger for the wireless communication network slice based on the slice configuration;
the network slice controller configured to instruct wireless access points to serve user devices for the wireless communication network slice based on the slice configuration and the wireless access points configured to exchange user data between the user devices and the NFVI;
the NFVI and the NFV VNFs configured to process the user data based on the NSD;
the network slice oracle configured to receive slice data from the wireless access points, the NFVI, and the NFV VNFs and to transfer the slice data to the distributed ledger for the wireless communication network slice;
the distributed ledger configured to receive and form a consensus for the slice data, and in response, store the slice data;
the distributed ledger configured to process the slice data to generate slice information and transfer the slice information to the network slice oracle;
the network slice oracle configured to transfer the slice information to the network slice controller;
the network slice controller configured to modify the slice configuration based on the slice information
the network slice oracle configured to receive additional slice data from the wireless communication devices and transfer the additional slice data to the distributed ledger for the wireless communication network slice; and
the distributed ledger configured to receive and form additional consensus for the additional slice data, and in response, store the additional slice data.

10. The wireless communication network of claim 9 further comprising:
the distributed ledger configured to process the additional slice data to generate additional slice information and transfer the additional slice information to the network slice oracle;
the network slice oracle configured to transfer the additional slice information to the network slice controller; and
the network slice controller configured to modify the slice configuration based on the additional slice information.

11. The wireless communication network of claim 9 wherein the slice data stored in the distributed ledger indicates the user devices in the wireless communication network slice.

12. The wireless communication network of claim 9 wherein the slice data stored in the distributed ledger indicates the wireless access points in the wireless communication network slice.

13. The wireless communication network of claim 9 wherein the slice data stored in the distributed ledger indicates the NFVI in the wireless communication network slice.

14. The wireless communication network of claim 9 wherein the slice data stored in the distributed ledger indicates the NFVI circuitry in the wireless communication network slice.

15. The wireless communication network of claim 9 wherein the slice data stored in the distributed ledger indicates the NFV VNFs in the wireless communication network slice.

16. The wireless communication network of claim 9 further comprising:
the network slice controller configured to validate hardware trust of the network slice oracle;
the network slice oracle configured to validate hardware trust of the network slice controller;
the network slice oracle configured to validate hardware trust of the digital ledger; and
the digital ledger configured to validate hardware trust of the network slice oracle.

\* \* \* \* \*